(12) United States Patent
Wang

(10) Patent No.: US 8,173,940 B2
(45) Date of Patent: May 8, 2012

(54) HIGH-POWER PLASTIC HEATER FOR AQUARIUM

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 796 days.

(21) Appl. No.: 12/328,107

(22) Filed: Dec. 4, 2008

(65) Prior Publication Data

US 2010/0140256 A1    Jun. 10, 2010

(51) Int. Cl.
  *H05B 3/44* (2006.01)
  *H05B 3/06* (2006.01)
  *H05B 3/78* (2006.01)
(52) U.S. Cl. .................. 219/544; 219/523; 392/497
(58) Field of Classification Search .................. 219/523, 219/538–542, 544–549; 392/441, 451, 497, 392/500–503; 338/231, 238–426
See application file for complete search history.

(56) References Cited

U.S. PATENT DOCUMENTS

| | | | | |
|---|---|---|---|---|
| 4,021,643 A * | 5/1977 | Hall et al. | ...................... | 219/523 |
| 4,107,514 A * | 8/1978 | Ellson | ............................ | 219/523 |
| 4,327,281 A * | 4/1982 | Jager et al. | ..................... | 219/523 |
| 5,392,380 A * | 2/1995 | Tsai | ................................ | 392/498 |
| 5,834,741 A * | 11/1998 | Tseng | ............................. | 219/506 |
| 6,061,500 A * | 5/2000 | Su | .................................... | 392/498 |
| 6,097,007 A | 8/2000 | Wang | | |
| 7,293,914 B2 | 11/2007 | Wang | | |

* cited by examiner

*Primary Examiner* — Sang Paik
(74) *Attorney, Agent, or Firm* — Guice Patents PLLC

(57) ABSTRACT

A high-power plastic aquarium heater includes a narrow, elongated, flat nickel-chrome steel strip wound on a mica tube and electrically connected with a circuit board inside a tubular plastic casing, and vacuum mounts fastened to the tubular plastic casing with pipe clamps for securing the tubular plastic casing to the inside wall of an aquarium. The use of the narrow, elongated, flat nickel-chrome steel strip facilitates positioning of the mica tube in the longitudinal center axis of the tubular plastic casing for even distribution of heat energy. Further, the nickel-chrome steel strip has a broad heat generating surface area in one particular direction to that the high-power plastic heater has a high performance while saving much the consumption of electric power.

8 Claims, 3 Drawing Sheets

HIGH-POWER PLASTIC HEATER FOR AQUARIUM

BACKGROUND OF THE INVENTION

1. Field of the Invention

The present invention relates to aquariums and more specifically, to a high-power plastic aquarium heater for aquarium, which utilizes a heat source made by winding a nickel-chrome strip on a mica tube.

2. Description of the Related Art

To keep the water in a big-scale aquarium warm, a high-power heater shall be used. A conventional high-power heater for this purpose normally uses a heating coil formed of a nickel-chrome wire for generating heat upon connection of electricity. This heating coil is wound on a thermal insulative holder made of ceramics or mica, and then mounted in a tubular casing. Similar designs are seen in U.S. Pat. No. 7,293,914, entitled "Temperature detecting heater with indicating structure for aquarium", and U.S. Pat. No. 6,097,007, entitled "Aquarium water temperature controller", both issued to the present inventor. The tubular casing can be a metal tube, ceramic tube, glass tube or plastic tube. A metal tube does not break and provides excellent heat spreading effect. However, a metal tube tends to cause electric leakage and to get rusted. A ceramic tube or glass tube avoids electric leakage and rust problems, however it may break easily.

A plastic casing is ideal for holding a heating coil in an aquarium. However, it is difficult to position a thermal insulative holder with a heating coil in the longitudinal center axis of a plastic casing accurately. If a thermal insulative holder is not accurately positioned in the longitudinal center axis of a plastic casing, heat energy cannot evenly distributed in all directions through the plastic casing. Further, because the heating coil generate heat in different directions, the performance of the heater is low.

SUMMARY OF THE INVENTION

The present invention has been accomplished under the circumstances in view. According to the invention, a high-power plastic aquarium heater comprises a narrow, elongated, flat nickel-chrome steel strip wound on a mica tube and electrically connected with a circuit board inside a tubular plastic casing, and vacuum mounts fastened to the tubular plastic casing with pipe clamps for securing the tubular plastic casing to the inside wall of an aquarium. The use of the narrow, elongated, flat nickel-chrome steel strip facilitates positioning of the mica tube in the longitudinal center axis of the tubular plastic casing for even distribution of heat energy. Further, the nickel-chrome steel strip has a broad heat generating surface area in one particular direction to that the high-power plastic heater has a high performance while saving much the consumption of electric power.

Further, a top cover assembly is fastened to the top side of the tubular plastic casing to guide an electrical power wire in a watertight status into the inside of the tubular plastic casing in electric connection with the circuit board. The top cover assembly holds a temperature regulating device for easy adjustment of the setting temperature.

DETAILED DESCRIPTION OF THE PREFERRED EMBODIMENT

Figure 1:
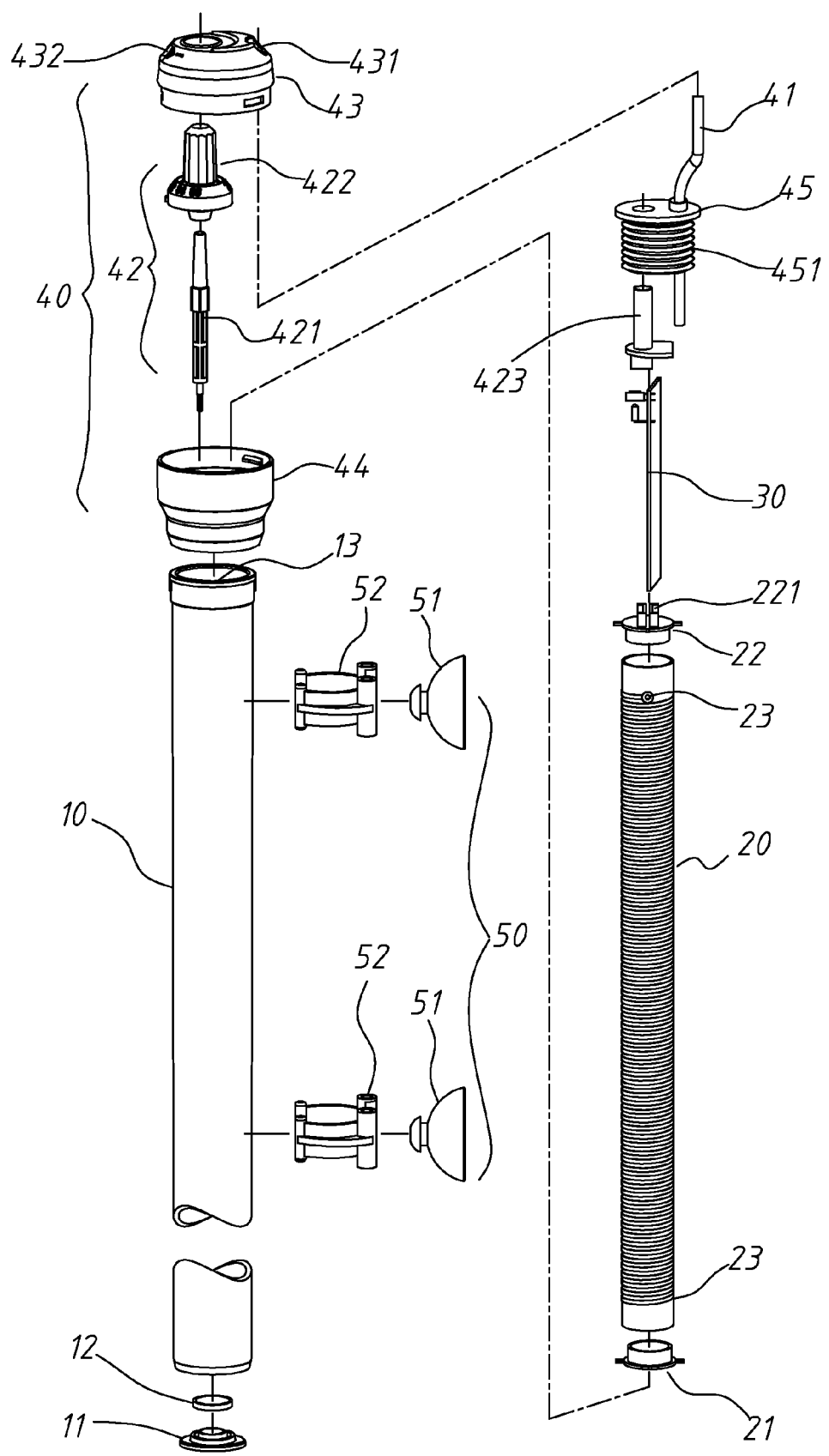
FIG. 1 is an exploded view of a high-power plastic heater for aquarium in accordance with the present invention.
Figure 2:
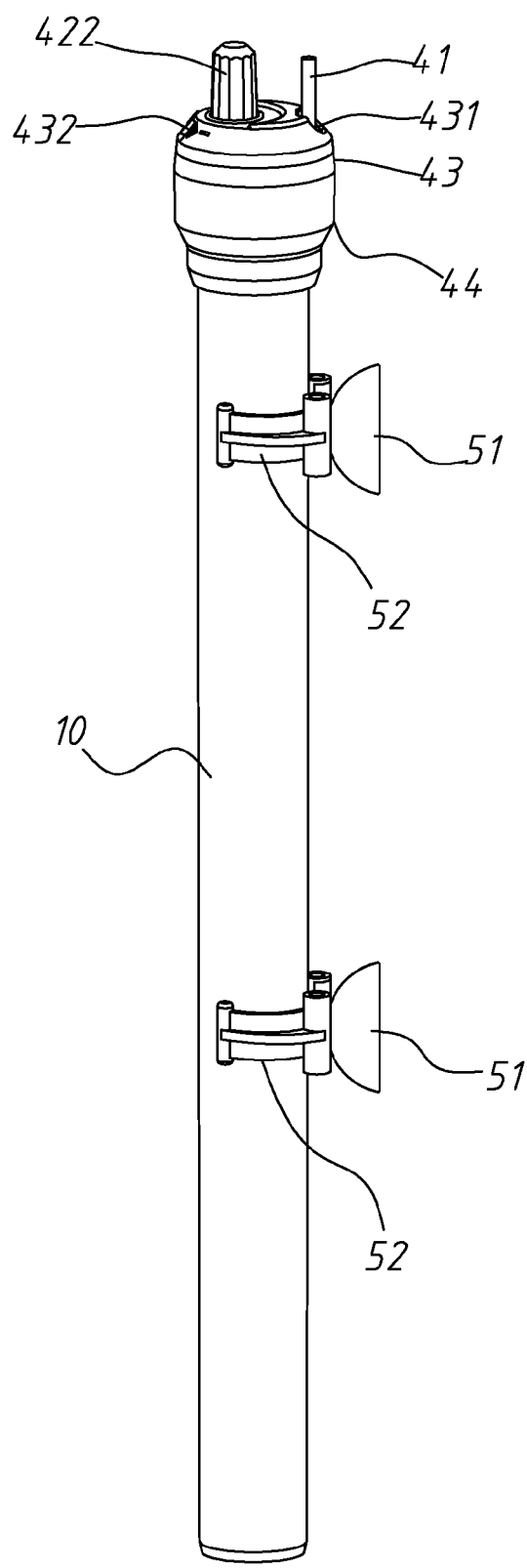
FIG. 2 is an elevational view of the high-power plastic heater in accordance with the present invention.
Figure 3:
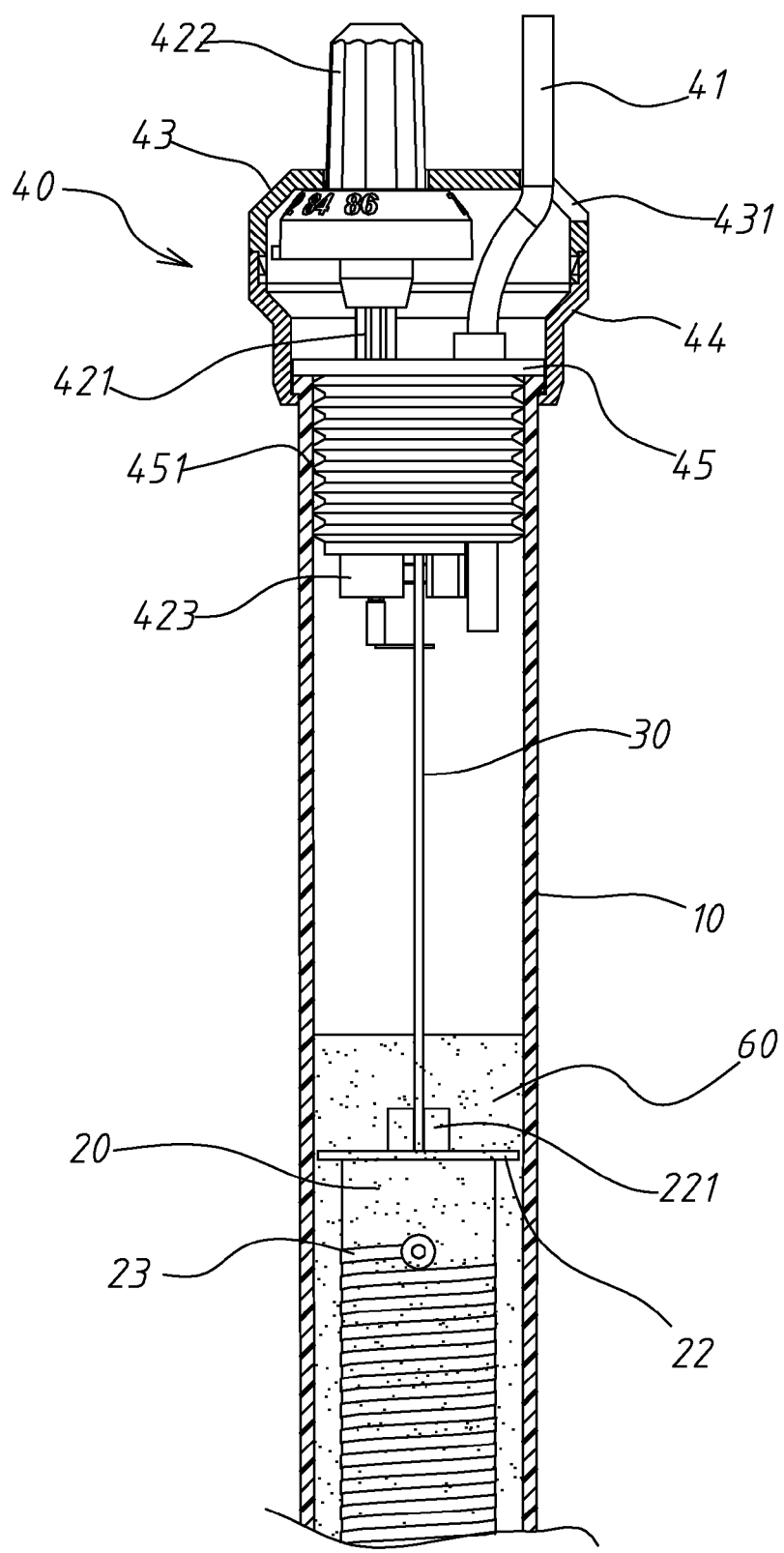
FIG. 3 is a sectional view of the high-power plastic heater in accordance with the present invention.

Referring to FIGS. 1~3, a high-power plastic heater comprises a tubular plastic casing 10, a mica tube 20, a circuit board 30, a top cover assembly 40, an anchoring device 50, and a thermal conductive filler 60.

The tubular plastic casing 10 has its bottom side sealed with a bottom cap 11 that holds a metal ring 12 in the bottom side of the tubular plastic casing 10, and an opening 13 formed in its top side. The mica tube 20 is inserted into the inside of the tubular plastic casing 10. The mica tube 20 has its bottom side sealed with a bottom cap 21, its top side sealed with a top cap 22, and its periphery surrounded by a nickel-chrome steel strip 23. The circuit board 30 is affixed to the top side of the mica tube 20, carrying a temperature control loop (not shown) for controlling power on/off status of the nickel-chrome steel strip 23 to further control the water temperature of the aquarium in which the high-power plastic heater is installed at a constant level. The top cover assembly 40 is provided at the top side of the tubular plastic casing 10 to seal the opening 13, having an electrical power wire 41 inserted therethrough and electrically connected to the circuit board 30. The anchoring device 50 is provided at the outside of the tubular plastic casing 10 for fastening the tubular plastic casing 10 to the inside of an aquarium. The thermal conductive filler 60 (see FIG. 3) is a mixture of magnesium oxide and epoxy and filled in the tubular plastic casing 10 around the mica tube 20.

Referring to FIGS. 1~3 again, the top cover assembly 40 has installed therein a temperature regulator 42. The temperature regulator 42 comprises a bracket 423, an operating rod 421 inserted through the bracket 423 into the inside of the tubular plastic casing 10 and connected to a variable resistor (not shown) at the circuit board 30. By means of operating the operating rod 421 to adjust the variable resistor of the circuit board 30, the heating temperature setting of the temperature control loop of the circuit board 30 is adjusted. The temperature regulator 42 further comprises a temperature indicator 422 operable with the operating rod 421 to indicate the set heating temperature. The top cover assembly 40 further comprises a view window 432 through which the indication of the temperature indicator 422 is seen.

The top cover assembly 40 further comprises an upper cover member 43, a bottom cover member 44, and a holder block 45. The upper cover member 43 has a through hole 431 for the passing of the electrical power wire 41. The aforesaid view window 432 is formed in the upper cover member 43. The bottom cover member 44 is fastened to the bottom side of the upper cover member 43. The holder block 45 is fastened to the bottom side of the bottom cover member 44, having a bellows tube 451 fastened to the opening 13 of the tubular plastic casing 10 to guide the electrical power wire 41 to the circuit board 30.

Further, the top cap 22 of the mica tube 20 is provided with a clamp 221 that secures the bottom side of the circuit board 20. The anchoring device 50 comprises two pipe clamps 52 fastened to the tubular plastic casing 10 at different elevations, and two vacuum mounts 51 respectively connected to the pipe clamps 52.

During the use of the high-power plastic heater, the vacuum mounts 51 are fastened to an inside wall of a glass housing of an aquarium and submerged in the water inside the aquarium, and then the electrical power wire 41 is connected to city power supply. When electrically connected, the temperature control loop of the circuit board 30 controls the nickel-chrome steel strip 23 to generate heat. Heat energy thus produced is transferred from the nickel-chrome steel strip 23 through the thermal conductive filler 20 to the tubular plastic casing 10 and then the water in the aquarium. When the temperature of the water in the aquarium reaches the set temperature level, the temperature control loop of the circuit board 30 automatically cuts off power supply from the nickel-chrome steel strip 23, and therefore the temperature of the water in the aquarium is kept at the desired level constantly. Further, the user can rotate the operating rod 421 to adjust the heating temperature setting of the temperature control loop of the circuit board 30. Through the view window 432, the indication of the set temperature level of the temperature indicator 422 is seen.

As stated above, the invention uses the nickel-chrome steel strip 23 to substitute for a nickel-chrome wire for winding on the mica tube 20 to constitute a heat source. This design facilitates positioning of the mica tube 20 in the longitudinal center axis of the tubular plastic casing 10 for even distribution of heat energy.

Further, the nickel-chrome steel strip 23 has its broad heat generating side facing the periphery of the tubular plastic casing 10. Therefore, the high-power plastic heater has a high performance while saving much the consumption of electric power.

A prototype of high-power plastic heater for aquarium has been constructed with the features of FIGS. 1~3. The high-power plastic heater for aquarium functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A high-power plastic heater installed in an aquarium for heating water in said aquarium, comprising:
    a tubular plastic casing, said tubular plastic casing having a bottom side sealed and an opening formed in a top side thereof;
    a mica tube inserted through said opening of said tubular plastic casing into the inside of said tubular plastic casing, said mica tube comprising a bottom cap sealing a bottom side thereof, a top cap sealing a top side thereof, and a nickel-chrome steel strip wound round the periphery thereof;
    a circuit board affixed to the top side of said mica tube and adapted to control power on/off status of said nickel-chrome steel strip by means of a temperature control thereof;
    a top cover assembly mounted in said tubular plastic casing to seal said opening of said tubular plastic casing;
    an electrical power wire inserted through said top cover assembly in a watertight manner and electrically connected to said circuit board;
    an anchoring device provided at said tubular plastic casing for fastening said tubular plastic casing to an inside wall of said aquarium; and
    a thermal conductive filler filled in said tubular plastic casing around said mica tube.

2. The high-power plastic heater as claimed in claim 1, wherein said top cover assembly comprises a temperature regulator, said temperature regulator comprising an operating rod inserted through into said tubular plastic casing and connected to said circuit board and operable to regulate the temperature setting of said temperature control loop.

3. The high-power plastic heater as claimed in claim 2, wherein said temperature regulator further comprises a temperature indicator connected to said operating rod and movable with said operating rod to indicate the setting.

4. The high-power plastic heater as claimed in claim 3, wherein said top cover assembly further comprises a bracket mounted in said tubular plastic casing to support said operating rod of said temperature regulator.

5. The high-power plastic heater as claimed in claim 1, wherein said mica tube comprises a top clamp that secures said circuit board in place.

6. The high-power plastic heater as claimed in claim 1, wherein said top cover assembly comprises an upper cover member, said upper cover member having a through hole for the passing of said electrical power wire, a bottom cover member fastened to a bottom side of said upper cover member, and a holder block, said holder block comprising a bellows tube fastened to said opening of said tubular plastic casing to guide said electrical power wire to said circuit board.

7. The high-power plastic heater as claimed in claim 1, wherein said anchoring device comprises two pipe clamps respectively fastened to the periphery of said tubular plastic casing at different elevations, and two vacuum mounts respectively connected to said pipe clamps for fastening said tubular plastic casing to the inside wall of the aquarium.

8. The high-power plastic heater as claimed in claim 1, wherein said thermal conductive filler is a mixture of magnesium oxide and epoxy.

\* \* \* \* \*